United States Patent [19]

Romano

[11] Patent Number: 5,246,402
[45] Date of Patent: Sep. 21, 1993

[54] PEDAL CRANK/GEAR ASSEMBLY FOR A BICYCLE

[75] Inventor: Antonio Romano, Padua, Italy

[73] Assignee: Campagnolo S.r.l., Vicenza, Italy

[21] Appl. No.: 842,656

[22] Filed: Feb. 27, 1992

[30] Foreign Application Priority Data

Mar. 4, 1991 [IT] Italy .............................. T091A000148

[51] Int. Cl.⁵ ......................... F16H 9/00; F16H 55/30
[52] U.S. Cl. ..................................... 474/78; 474/160; 74/594.2
[58] Field of Search ................. 474/144, 158, 160–162, 474/164, 78; 74/594.2, 448

[56] References Cited

U.S. PATENT DOCUMENTS

| | | |
|---|---|---|
| 2,451,690 | 10/1948 | Oehler ............................ 474/160 X |
| 3,835,729 | 9/1974 | Tarutani ........................... 474/160 X |
| 4,439,172 | 3/1984 | Segawa ............................ 474/144 X |
| 4,453,924 | 6/1984 | Sugino .................................. 474/160 |
| 4,598,608 | 7/1986 | Ueno ................................ 474/160 X |
| 4,741,724 | 3/1988 | Wang .................................. 474/160 |
| 4,988,328 | 1/1991 | Iwasaki et al. ..................... 474/160 |

FOREIGN PATENT DOCUMENTS

| | | | |
|---|---|---|---|
| 443170 | 12/1948 | Italy ................................... | 474/160 |
| 121727 | 5/1948 | Sweden .............................. | 474/160 |

Primary Examiner—Ramon S. Britts
Assistant Examiner—Roger J. Schoeppel
Attorney, Agent, or Firm—Sughrue, Mion, Zinn Macpeak & Seas

[57] ABSTRACT

The gears associated with a bicycle pedal crank are mounted by means of a splined coupling on a hub fixed rigidly to the body of the pedal crank.

7 Claims, 2 Drawing Sheets

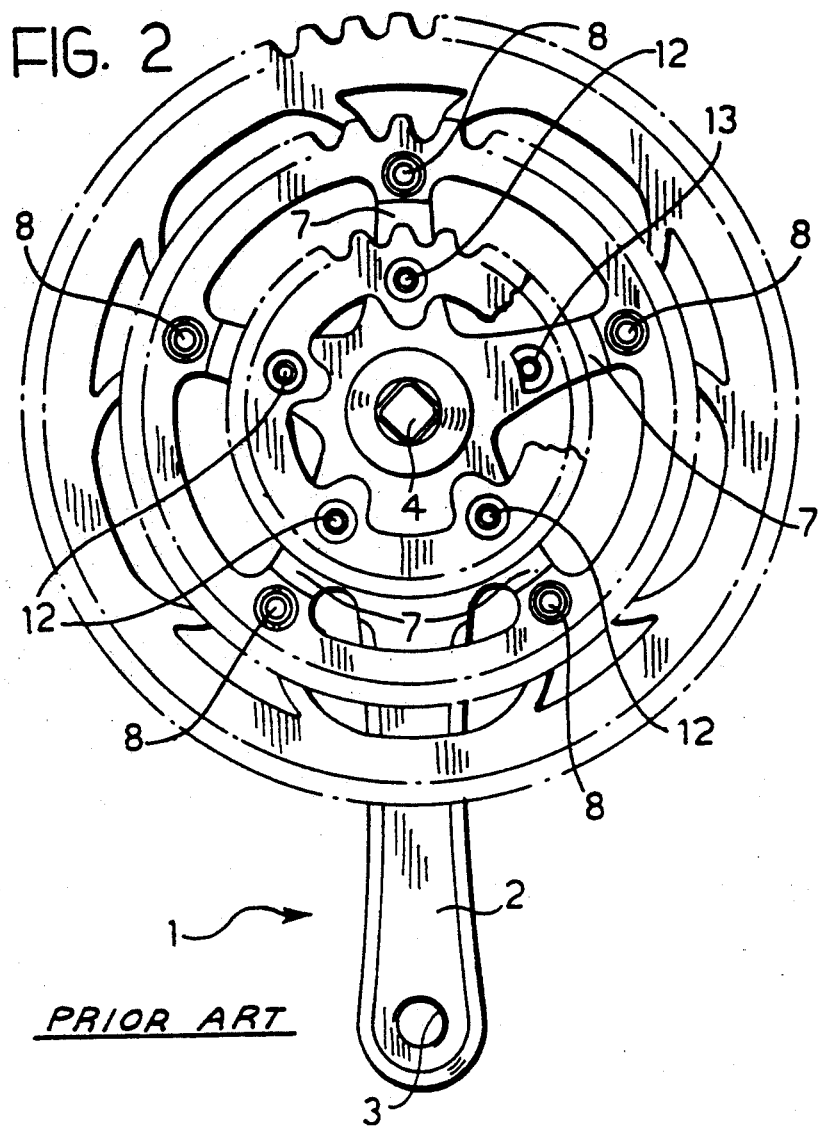
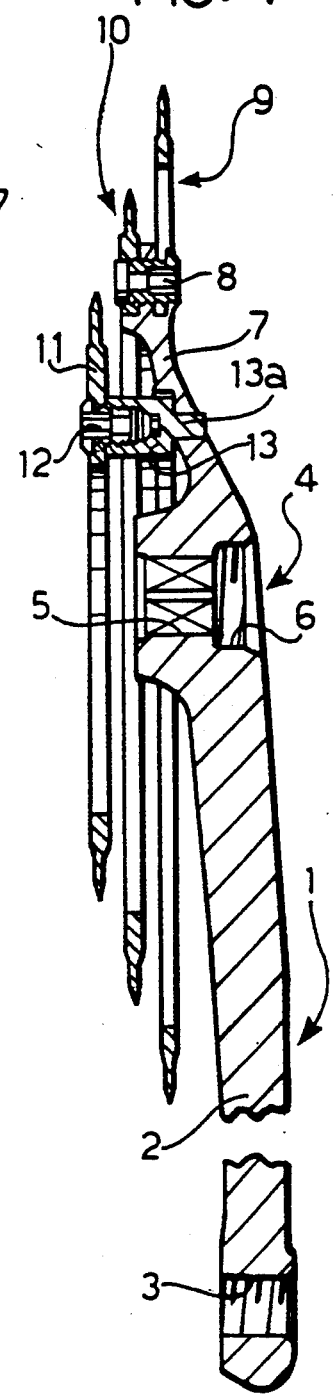
FIG. 2
PRIOR ART
FIG. 1

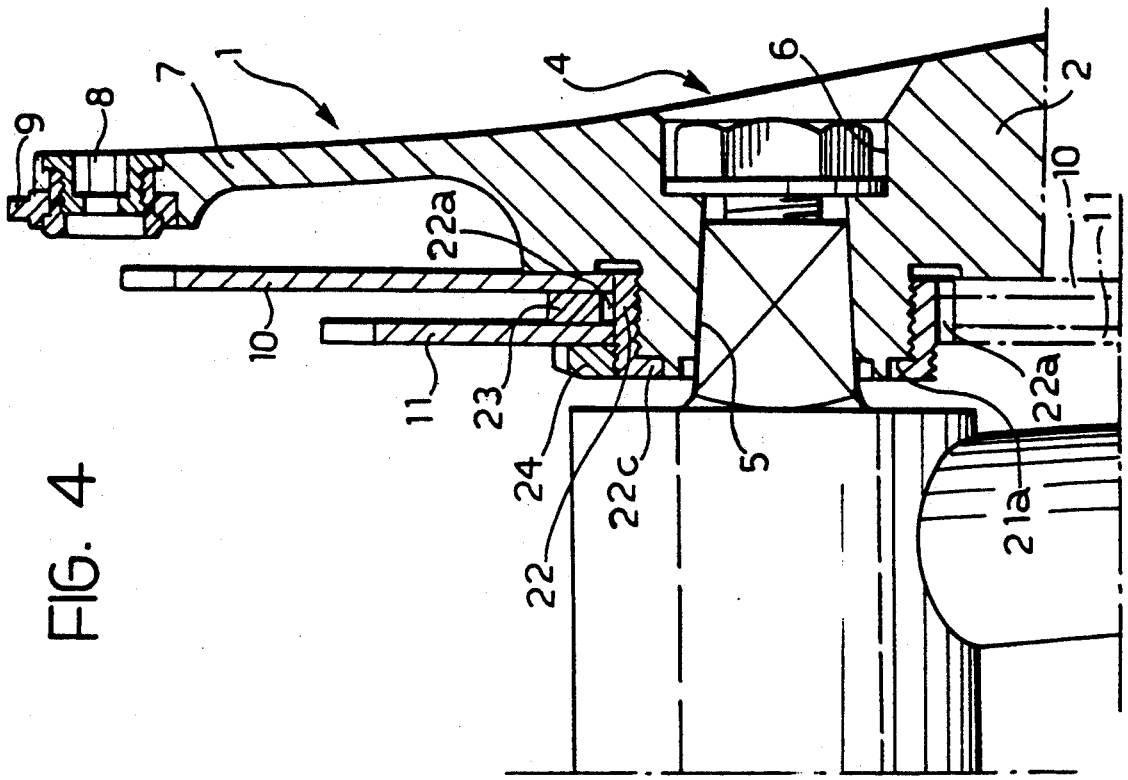
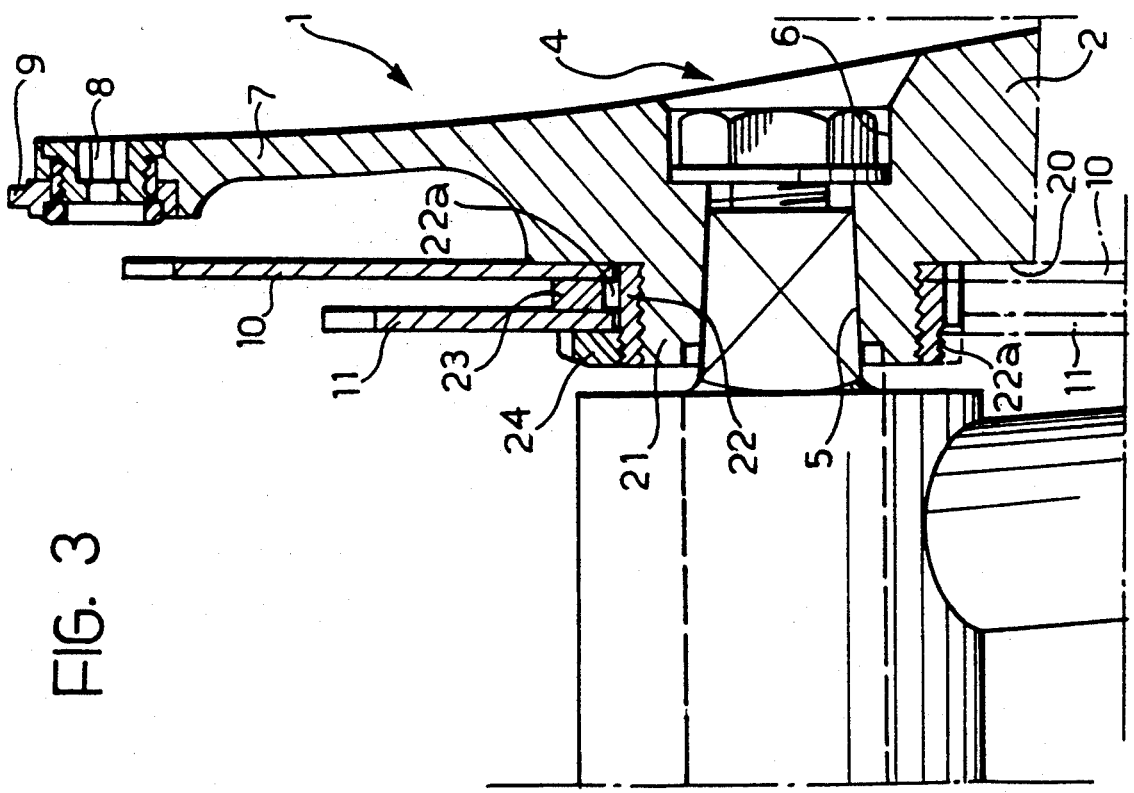

PEDAL CRANK/GEAR ASSEMBLY FOR A BICYCLE

BACKGROUND OF THE INVENTION

The present invention relates to a pedal crank/gear assembly for a bicycle, of the type in which the pedal crank is arranged at one end for connection to the spindle of the central drive of the bicycle and carries a series of gears for meshing selectively with the bicycle chain.

FIGS. 1, 2 of the appended drawings illustrate a pedal crank/gear assembly of conventional type. The pedal crank I has a body 2 with a threaded hole 3 in one end for the connection of the pedal and a hole 4 in the other end for the connection of the spindle of the central drive of the bicycle, including a tapered square-section part 5 and a threaded part 6. The said end of the pedal crank I which is arranged for connection to the spindle of the central drive of the bicycle has spokes 7 to whose ends are fixed two gears 9, 10 by bolts 8. More precisely, the gears 9, 10 have flat annular bodies fixed by the bolts 8 to the two opposing faces of the ends of the spokes 7. A third gear Il of smaller diameter than that of the gear 10 which latter in turn has a smaller diameter than that of the gear 9, also has a flat annular body and is fixed by screws 12 to bosses 13 constituted by members separate from the pedal crank body 2, and having end spigots 13a (FIG. 1) screwed into corresponding threaded holes of the spokes 7.

The type of assembly described above does not enable gears having a diameter or a number of teeth less than a predetermined value to be connected to the pedal crank. This opposes the recent tendency to reduce the diameter of the gears on the central drive and of the sprockets on the hub of the rear wheel of the bicycle, for a given transmission ratio, in order to lighten the bicycle itself. This tendency is obviously particularly noted in the case of competition bicycles.

SUMMARY OF THE INVENTION

The object of the present invention is to provide a pedal crank/gear assembly which enables the gears to be assembled and removed quickly and easily while at the same time allowing the use of rather smaller diameter gears, that is, for example, having 22 or even fewer teeth.

In order to achieve this object, the invention provides a pedal crank/gear assembly characterised in that the said end of the pedal crank intended to be connected to the spindle of the central drive of the bicycle has a hub on which at least some of the gears are mounted by means of a splined coupling.

The hub may be constituted by a separate part or may be integral with the pedal crank body. When the hub is a separate from the pedal crank body, it is fixed to the latter, for example by a threaded coupling.

The various gears each have a body with a central splined hole so as to enable them to slide on to the corresponding splines of the hub. When assembled, two adjacent gears are separated from each other by a spacer ring, possibly with an inner splined surface, which is also slidably mounted on the hub. Finally, the pack of gears is clamped together, preferably by means of an internally-threaded ring nut screwed on to a threaded end portion of the hub.

It should be noted that a splined coupling of the type described above is already known for the assembly of sprockets on the body of the free wheel associated with the rear hub of the bicycle. The adoption of a similar assembly for the gears associated with the central drive enables the manufacture and storage of bicycles parts to be simplified and rationalised. Indeed, when the hub described above is constituted by an element separate from the pedal crank body, it is also possible to make this hub serve equally well for the assembly of the gears on the pedal crank and for the assembly of the sprockets on the body of the free wheel.

Finally, the pedal crank body may in any case, retain the known conformation with its end being provided with spokes for the connection, in the conventional manner, of a gear or gears of larger dimensions.

BRIEF DESCRIPTION OF THE DRAWINGS

Further characteristics and advantages of the invention will become clear from the description which follows with reference to the appended drawings, provided purely by way of non-limiting example, in which:

FIGS. 1, 2 are a sectional view and a side view of a pedal crank/gear assembly according to the prior art, which has already been described in the introduction to the present specification, FIGS. 3, 4 are sectional views illustrating two variants of the pedal crank/gear assembly of the invention.

DETAILED DESCRIPTION OF THE INVENTION

With reference to FIG. 3, the body 2 of the pedal crank 1 in this case also has the usual hole 4 for connection to the spindle of the central drive of the bicycle and the usual spokes 7 to the ends of which the annular flattened body of a large-diameter gear is bolted by means of bolts 8.

In accordance to the invention, a threaded cylindrical portion 21 projects from that end face 20 of the body 2 which will face the housing for the central drive of the bicycle, an internally-threaded hub 22 being screwed on to this threaded portion. In the case of FIG. 3, the hub 22 is screwed on to the threaded portion 21 until it bears against the face 20. The outer surface 22 has a plurality of equi-angularly spaced, longitudinal grooves 22a for the sliding assembly of a gear 10 and a gear 11 both of which have flat bodies with a central splined hole with a shape complementary to that of the shape of the splined outer surface of the hub 22. Between the two gears 10 and 11 is axially interposed a spacer ring 23 which also has a central hole, optionally splined, for its sliding assembly on the splined hub 22. The pack constituted by the two gears 10, 11 and the spacer ring 23 is clamped by an internally-threaded ring nut 24 which is screwed on to a threaded end portion 22b of the hub 22. In the clamped condition, the pack comprising the two gears 10, 11 and the spacer ring 23 bears against the front surface 20 of the pedal crank body.

The variant of FIG. 4 differs from that of FIG. 3 soley in that, in this case, the body of the hub 22 has an end wall 22c which, in the assembled condition, bears against the end face 21a of the cylindrical portion 21 of the pedal crank body. In this assembled condition, the opposite surface of the hub 22 is however, spaced from the face 20 and from the body of the pedal crank.

As already indicated in the preceding description, it is however also possible to provide for the hub 22 to be formed in one piece with the pedal crank body.

The assembly described above makes the operations of replacing the gears particularly quick and simple and also makes it possible to assemble gears having a much smaller diameter (much smaller even than that of the gear 1 illustrated in FIGS. 3, 4).

What is claimed is:

1. A pedal crank/gear assembly for a bicycle, in which the pedal crank has connecting means at one end for connection to the spindle of a central drive of the bicycle, said one end carrying at least two gears for meshing selectively with the bicycle chain, wherein said one end of said pedal crank has a hub defining a splined surface and said gears each have a cooperating splined surface whereby they can be assembled on said hub.

2. The assembly of claim wherein said hub is constituted by a member separate from said pedal crank body and fixed thereto by a threaded coupling.

3. The assembly of claim 1, wherein spacer rings are provided to separate said gears mounted on said hub from each other.

4. The assembly of claim 3, wherein said pedal crank has an end face and said hub projects axially relative to said end face and has a threaded end portion remote therefrom, and wherein an internally-threaded ring nut is screwed on to said end portion to clamp said gears and said spacer rings, mounted on said hub, axially against said end face of said pedal crank.

5. The assembly of claim 4, wherein one end of said hub bears against said end face of said petad crank in the assembled condition.

6. The assembly of claim 5, wherein said hub is cup shape and has a base wall in abutment with an end face of the pedal crank in the assembled condition.

7. The assembly of claim 1, wherein said pedal crank includes a plurality of spokes at said one end and an additional, larger-diameter gear is fixed to the ends of said spokes.

* * * * *